No. 745,232. PATENTED NOV. 24, 1903.
O. J. OHLSON.
HOOF PROTECTOR.
APPLICATION FILED MAY 4, 1903.
NO MODEL.
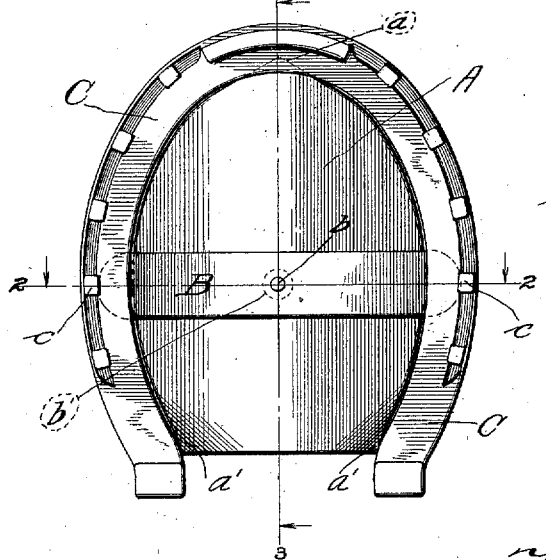
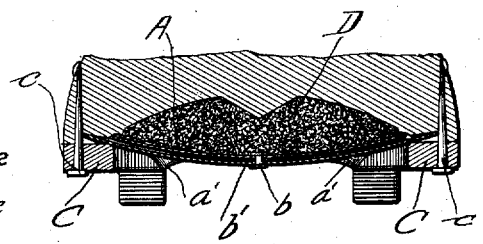
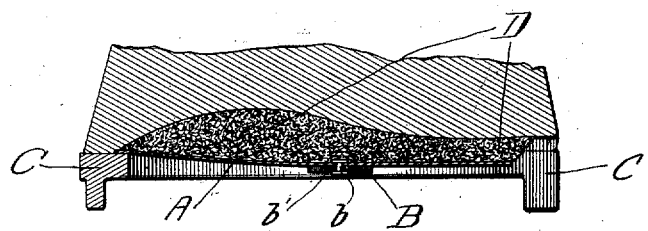
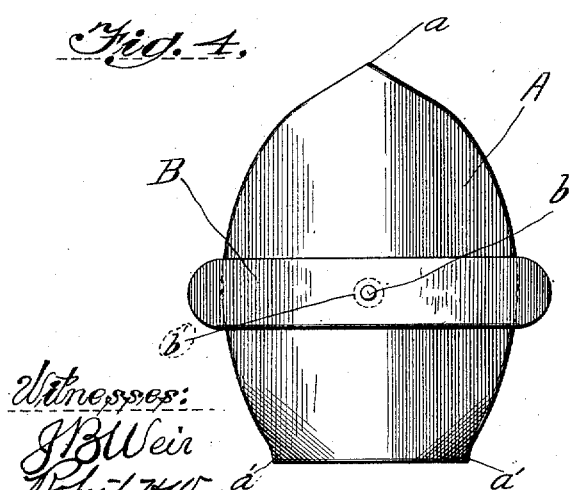
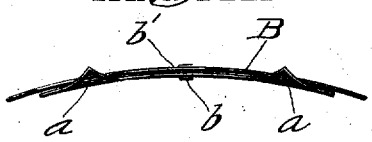
Witnesses:
J. B. Weir
Robert H. Weir
Inventor:
Olof J. Ohlson
by Bulkley & Durand
Attys No. 745,232. Patented November 24, 1903.

UNITED STATES PATENT OFFICE.

OLAF J. OHLSON, OF CHICAGO, ILLINOIS.

HOOF-PROTECTOR.

SPECIFICATION forming part of Letters Patent No. 745,232, dated November 24, 1903.

Application filed May 4, 1903. Serial No. 155,590. (No model.)

*To all whom it may concern:*

Be it known that I, OLAF J. OHLSON, a citizen of the United States of America, and a resident of Chicago, Cook county, Illinois, have invented a certain new and useful Improvement in Hoof-Protectors, of which the following is a specification.

A hoof-protector characterized by my invention consists, preferably, of a dished or curved metal plate adapted to be applied to a shod hoof with its concave surface next to the bottom of the hoof and provided on its under or convex side with a pivoted locking-bar adapted to be swung into position to permit its ends to project between the hoof and the side portions of the shoe, so as to lock the said plate firmly in place. Both the dished plate and its locking-bar can be made of steel, and consequently my improved hoof-protector may not only be of a light, simple, and inexpensive nature, but, furthermore, it can be of such character that when applied it relieves the tender or soft portions of the hoof from all pressure even though the weight of the horse is thrown upon the said plate, as by stepping upon a cobblestone or other like object.

The nature and advantages of my invention will, however, hereinafter more fully appear.

In the accompanying drawings, Figure 1 is a bottom plan of a shod hoof to which my improved protector has been applied and preferably locked in place. Fig. 2 is a cross-section on line 2 2 in Fig. 1. Fig. 3 is a horizontal section on line 3 3 in Fig. 1. Fig. 4 is a bottom plan of my improved protector. Fig. 5 is a rear edge view of the protector shown in Fig. 4.

The very simple and inexpensive hoof-protector as thus illustrated consists of the dished or curved plate A and a pivoted locking-bar B. The said plate is preferably of a shape to fit snugly within the horseshoe C, as shown in Fig. 1, and can be provided with a toe portion $a$, adapted to project between the hoof and the front or toe portion of the shoe. The said plate may also be provided with a heel having downwardly-bent corner portions $a'$, adapted to bear against the heel portions of the shoe, so as to prevent lateral displacement of the plate. The curvature of the plate is preferably such that more or less space will be left between its concave upper surface and the bottom of the hoof when it is adjusted in place. The locking-bar B is preferably pivoted centrally to the protecting-plate by a rivet $b$, a washer $b'$ being preferably interposed between the bar and the plate, so as to permit the bar to be more readily rotated. The ends of the bar can be round, as shown, so as to permit them to slide readily between the shoe and the hoof when it is desired to apply the plate and lock it in place. If desired, the said plate can be of a length to have its ends engage the nails $c$, as by such arrangement the bar is braced against endwise play or movement, and consequently both the bar and the plate can be made of comparatively thin metal without danger of an undesirable flattening when the weight of the horse is thrown entirely upon the protector, as would be the case should the hoof be placed upon a cobblestone or other object of a size to project upwardly between the sides of the shoe. The plate itself can be of thin steel or other suitable material and when properly applied and locked in place protects the central and tender portions of the hoof against injury. If desired, the cavity between the bottom of the hoof and the concave upper surface of the plate can be filled with pine tar and oakum D or other suitable soft material.

What I claim as my invention is—

1. A hoof-protector, comprising a curved metal plate adapted to be inserted within a shoe on a hoof and provided on its convex under side with a pivoted locking-bar provided with end portions adapted to project between the hoof and the opposite side portions of said shoe.

2. A hoof-protector, comprising a curved metal plate adapted to be inserted within a shoe on a hoof, the said plate being provided with downwardly-bent heel portions adapted to bear against the opposite heel portions of the said shoe, and provided also with a toe portion adapted to project between the hoof and the forward or toe portion of the shoe, and a locking-bar pivotedly mounted upon the convex under side of said plate, said bar having its opposite ends adapted to be inserted between the hoof and the opposite side portions of said shoe.

3. A hoof-protector, comprising a curved steel plate having a concave upper surface and a convex lower surface, said plate having a toe portion adapted to project between the hoof and the shoe, and having also rear corner portions adapted to bear sidewise against the opposite heel portions of the shoe, and a pivoted locking-bar mounted upon the convex under side of said plate and provided with end portions adapted to be inserted between the hoof and the opposite side portions of the shoe, said bar being of a length to have its ends bear against the nails of the horseshoe when it is turned at right angles to the length of said plate.

4. A hoof-protector, comprising a curved metal plate adapted to be inserted within a shoe on a hoof and provided on its convex under side with a pivoted locking-bar provided with end portions adapted to project between the hoof and the opposite side portions of said shoe, and a suitable quantity of pine tar and oakum packed into the cavity between the hoof and the said plate.

5. A hoof-protector comprising a metal plate having a concave upper surface and a convex under surface, the plate being adapted to have certain parts of its edge inserted between the hoof and the shoe, and a locking-bar pivoted at its center to the under side of the said plate, said bar being curved to correspond to the curvature of the plate, and provided with end portions adapted to be inserted between the hoof and the side portions of the shoe.

Signed by me at Chicago, Illinois, this 2d day of May, 1903.

OLAF J. OHLSON.

Witnesses:
  CHARLES W. HICKOK,
  WM. A. HARDERS.